Sept. 1, 1936.  H. H. DULANY  2,053,238
PINEAPPLE PACKING
Filed Sept. 17, 1935
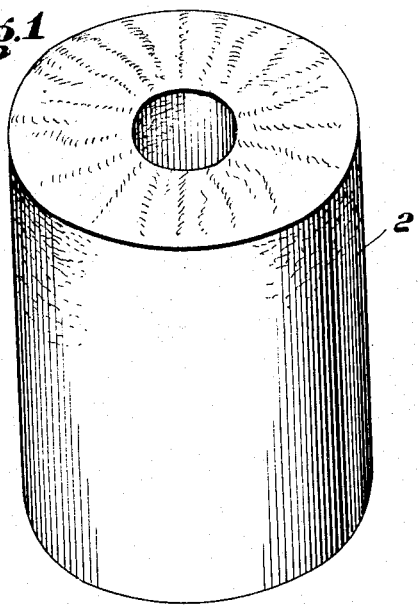
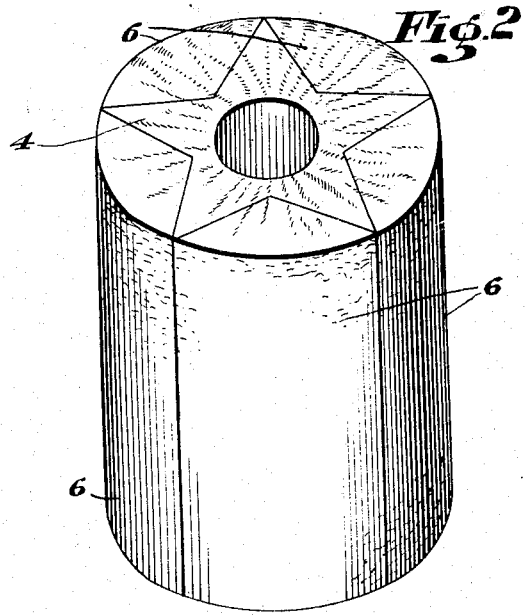
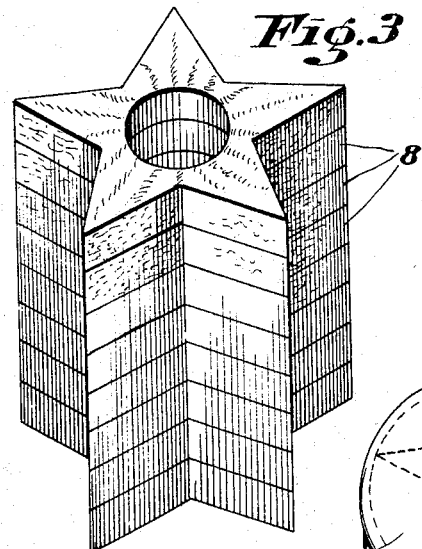
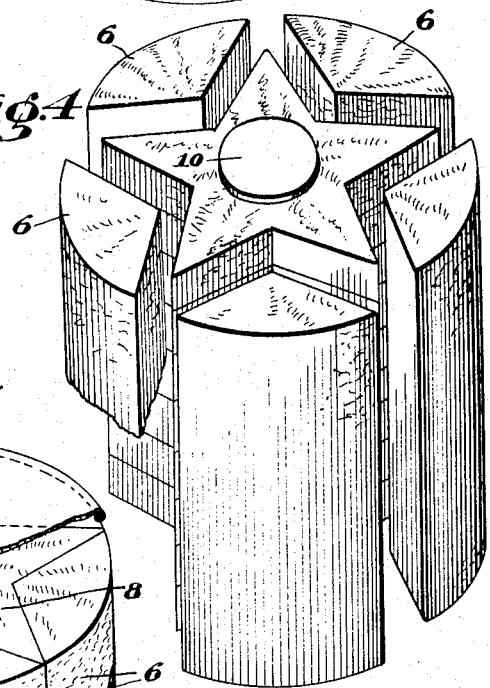
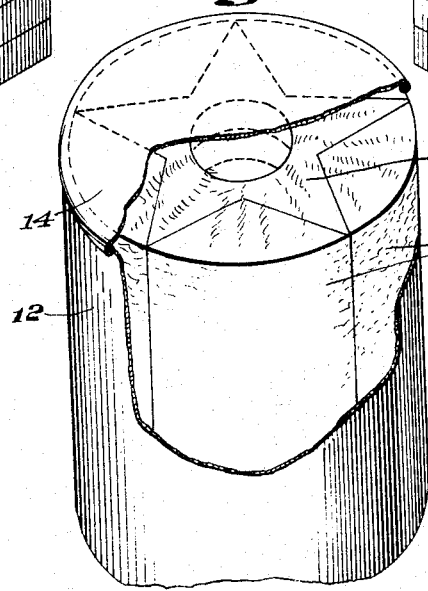
INVENTOR:
Helen Hughes Dulany
BY H. L. Kirkpatrick
ATTORNEY Patented Sept. 1, 1936

2,053,238

UNITED STATES PATENT OFFICE 2,053,238

PINEAPPLE PACKING

Helen Hughes Dulany, Chicago, Ill., assignor to Hawaiian Pineapple Company, Limited, Honolulu, Territory of Hawaii, a corporation of Hawaii Application September 17, 1935, Serial No. 40,881

6 Claims. (Cl. 99—186)

This invention relates to pineapple packing and has for its object the provision of a novel package of pineapple in cooked or preserved form including a sealed container, and also a novel method of packing the same. It is the specific object of this invention to provide the hereinafter described new, attractive and useful form of pineapple pack embodying fingers or bars cut longitudinally of the exterior of the pineapple together with slices cut transversely of the pineapple, with the fingers and slices related and assembled so as together to define a substantially solid and stable mass of pineapple filling the can or container. In this way the fingers, which are considered the finest part of a pineapple, may be separately cut and canned with a special form of sliced pineapple so that, despite shipment and handling, both the slices and the fingers are preserved intact until they are used and, moreover, thus provide various precut, new, and attractive forms of pineapple which are desirable for and may be embodied in fancy salads, special desserts, and the like.

In the drawing, which illustrates a preferred form of pack and method:—

Fig. 1 is a perspective view of a cored cylinder of pineapple cut from the center of the fruit along the longitudinal axis thereof;

Fig. 2 illustrates in perspective the cored cylinder of Fig. 1 having longitudinally cut in the peripheral portion thereof longitudinal fingers leaving a solid central portion of star-shaped cross-section;

Fig. 3 is a perspective view illustrating the slicing of the central portion of star-shaped cross-sectional form;

Fig. 4 shows in perspective the sliced star-shaped central portion as reassembled with the longitudinal fingers fitting the reentrant angles thereof to provide a substantially solid cylindrical mass; and Fig. 5 illustrates a can or container having therein the fingers and stars assembled as in Fig. 4, so as to therein mutually support and sustain one another in a stable mass substantially filling the container.

Referring to the drawing in which like numerals represent like parts,—the preferred method involves the use of a so-called Ginaca machine, as well known in the art, to prepare a cylinder of pineapple from the center of the fruit as shown at 2 in Fig. 1. Though a Ginaca machine usually cores as well as shapes the cylinder of pineapple, the coring device may be omitted so as to provide a solid cylinder of pineapple instead of a cored cylinder as shown.

In Fig. 2 there is illustrated the initial cutting of the cylinder 2 of Fig. 1 so that there are provided in the preferred method and type there shown a central star-shaped portion 4 with its alternating indentations and projections and a series of complementary longitudinal fingers or bars 6 (as shown there are five sector-like bars) which bars 6 may then be laid back or removed so as to permit the transverse slicing of the star-shaped central portion 4 of Fig. 2 into a series of slices 8 shown superimposed in Fig. 3. The slicing of the central portion of Fig. 3 is followed by the assembly, in the can or prior thereto, illustrated in Figs. 4 and 5 of the bars 6 and flat star-shaped slices 8 to which may be added if desired, the longitudinal one-piece core 10 which was originally removed in the Ginaca machine in the course of preparation of the cored cylinder 2 of Fig. 1.

In the preferred practice, the portions of pineapple are packed in cans 12 as shown in Fig. 5 so as in assembled form to substantially fill the same to provide a substantially solid pack or mass and the cans are then, in the ordinary manner, successively passed through a syruping machine, vacuum double seamer, and subsequent cooking process in the course of which steps there is added, as well known in the art, the cover 14, hermetically sealing the contents of the package.

Thus there is provided a solid mass of pineapple substantially filling a container, preferably cylindrical as shown, and in which the mutual or complementary relation of the pieces of pineapple is stabilized and maintained by the contact—meaning supporting contact or supporting relation—of the longitudinal fingers with the edge surfaces of the flat sliced members and the contact or support of the longitudinal fingers both with said sliced members and with the can. Similarly, a longitudinal core member, when employed, stabilizes the surrounding mass of pineapple. Whether or not the core be employed, any destructive motion of the pieces relative to the container is prevented and the pieces preserved intact and in their form as originally canned. It will be appreciated that the cylinder or other shape of pineapple as originally formed (Fig. 2) may be divided into various geometrical or non-geometrical forms involving straight lines, curves, or both, to provide various complementary shapes of fingers and slices which provide a solid mass of pineapple substantially filling the container, and it will also be appreciated that the can when packed may or may not include pieces all from the same pineapple.

Having described my invention, what I wish to claim and secure by Letters Patent is:

1. As an article of commerce, a package comprising a container hermetically sealed and having therein and substantially filling the interior thereof a number of assembled separate pieces of pineapple including flat slices and longitudinal pieces, extending thereacross, said slices and longitudinal pieces together comprising a solid mass of generally geometrical form, said mass being stabilized and maintained in said form by contact of said longitudinal pieces with said slices therebetween and the contact of the outer surfaces of said longitudinal pieces with the surrounding interior surface of said container.

2. As an article of commerce, a package comprising a container hermetically sealed and having therein and substantially filling the interior thereof a number of assembled separate pieces of pineapple including flat slices having edges with alternating projections and depressions and narrow longitudinal pieces, extending thereacross, said slices and longitudinal pieces together comprising a solid mass of generally cylindrical form, said mass being stabilized and maintained in said form by contact of said longitudinal pieces with said slices therebetween and the contact of the outer surfaces of said longitudinal pieces with the curved surrounding interior surface of said container.

3. As an article of commerce, a package comprising a container hermetically sealed and having therein and substantially filling the interior thereof a number of assembled separate pieces of pineapple including flat slices having edges with alternating projections and depressions, a central longitudinal core contacting said slices, and narrow longitudinal pieces, said slices and longitudinal pieces extending thereacross together comprising a solid mass of generally cylindrical form, said mass being stabilized and maintained in said form by contact of said longitudinal pieces with said slices therebetween and the contact of the outer surfaces of said longitudinal pieces with the curved surrounding interior surface of said container.

4. As an article of commerce, a package comprising a container hermetically sealed and having therein and substantially filling the interior thereof a number of assembled separate pieces of pineapple including star-shaped slices and narrow longitudinal pieces extending thereacross, said slices and longitudinal pieces together comprising a solid mass of generally cylindrical form, said mass being stabilized and maintained in said form by contact of said longitudinal pieces with said slices therebetween and the contact of the outer surfaces of said longitudinal pieces with the curved surrounding interior surface of said container.

5. The process of pineapple packing which consists in cutting from fresh fruit a shape to conform substantially to a predetermined shape of container, severing peripheral longitudinal portions from said shape, transversely slicing the remaining portion, packing and hermetically sealing in assembled relation in said container, the slices and longitudinal portions, with the latter extending across the slices to provide a solid mass of generally geometrical form, said mass being stabilized and maintained in said form by contact of said longitudinal portions with the slices therebetween and the contact of the outer surfaces of said longitudinal portions with the surrounding interior surface of said container.

6. The process of pineapple packing which consists in cutting from fresh fruit a shape to conform substantially to a predetermined shape of container, severing peripherally longitudinal portions from said shape, leaving a complementary central portion having external longitudinal indentations, slicing said latter portion transversely, packing and hermetically sealing in assembled relation in said container, the slices and longitudinal portions, with the latter extending across the slices to provide a solid mass of generally geometrical form, said mass being stabilized and maintained in said form by contact of said longitudinal portions with the slices therebetween and the contact of the outer surfaces of said longitudinal portions with the surrounding interior surface of said container.

HELEN HUGHES DULANY.